(12) United States Patent
Pellegrino (10) Patent No.: US 8,191,547 B2
(45) Date of Patent: Jun. 5, 2012

(54) PORTABLE SOLAR-HEATING SYSTEM HAVING AN INFLATABLE SOLAR COLLECTOR

(75) Inventor: Stephen T. Pellegrino, Narragansett, RI (US)

(73) Assignee: S-2Tech LLC, Narragansett, RI (US)

( * ) Notice: Subject to any disclaimer, the term of this patent is extended or adjusted under 35 U.S.C. 154(b) by 433 days.

(21) Appl. No.: 12/536,954

(22) Filed: Aug. 6, 2009

(65) Prior Publication Data

US 2010/0101562 A1 Apr. 29, 2010

Related U.S. Application Data

(60) Provisional application No. 61/107,738, filed on Oct. 23, 2008.

(51) Int. Cl.
*F24J 2/36* (2006.01)
*F24J 2/04* (2006.01)
*E04D 13/18* (2006.01)
(52) U.S. Cl. ......... 126/625; 126/624; 126/628; 126/647
(58) Field of Classification Search .................. 126/625, 126/628, 647, 624
See application file for complete search history.

(56) References Cited

U.S. PATENT DOCUMENTS

| | | | |
|---|---|---|---|
| 3,875,925 A * | 4/1975 | Johnston | 126/643 |
| 4,036,209 A | 7/1977 | Press | |
| 4,051,834 A | 10/1977 | Fletcher et al. | |
| 4,129,116 A | 12/1978 | Kent | |
| 4,160,443 A | 7/1979 | Brindle et al. | |
| 4,182,307 A | 1/1980 | Brindle et al. | |
| 4,187,896 A | 2/1980 | Shore | |
| 4,203,420 A | 5/1980 | Schoenfelder | |
| 4,203,425 A | 5/1980 | Clark | |

(Continued)

FOREIGN PATENT DOCUMENTS

| | | |
|---|---|---|
| WO | WO8808105 A1 | 10/1988 |
| WO | WO9942766 | 8/1999 |
| WO | WO2008095502 A2 | 8/2008 |
| WO | WO 2008119094 A2 * | 10/2008 |

OTHER PUBLICATIONS

"Environmental Graffiti/Introducing Inflatable Solar Panels!" www.environmentalgraffiti.com, 2008, [retrieved on Mar. 24, 2009] Retrieved from the Internet: <URL: http://www.environmentalgraffiti.com/sciencetech/introducing-inflatable-solar-panels/1093.html> (10 pages).

(Continued)

*Primary Examiner* — Kenneth Rinehart
*Assistant Examiner* — William Corboy
(74) *Attorney, Agent, or Firm* — Mendelsohn, Drucker & Associates, P.C.; Yuri Gruzdkov (57) ABSTRACT

A solar-heating system having an inflatable solar collector connected to a housing that can be installed, e.g., in a sash window of a house. The housing has an air blower that draws air from the interior of the house and directs it into the inflatable solar collector, which is positioned outside the window. The collector has a flexible permeable membrane that serves as a transpired absorber of solar radiation. The air flowing through the collector is heated when it percolates through the membrane exposed to solar light. The heated air is returned back to the interior of the house, thereby providing space heating. In certain embodiments, in addition to serving as a transpired absorber, the membrane can also serve as an air filter that removes particles, odor-causing pollutants, and/or allergens from the drawn air.

19 Claims, 8 Drawing Sheets

U.S. PATENT DOCUMENTS

| | | | | |
|---|---|---|---|---|
| 4,233,963 | A | * 11/1980 | Werner | 126/628 |
| 4,257,396 | A | 3/1981 | Reinert | |
| 4,271,824 | A | 6/1981 | Decker, III | |
| 4,314,548 | A | 2/1982 | Hanson | |
| 4,404,958 | A | 9/1983 | Boettcher | |
| 4,416,255 | A | 11/1983 | Secamiglio et al. | |
| 4,422,443 | A | 12/1983 | Arendt | |
| 4,429,545 | A | 2/1984 | Steinberg | |
| 4,485,804 | A | 12/1984 | Sharpe | |
| 4,510,922 | A | 4/1985 | Roussos | |
| 4,526,162 | A | 7/1985 | Arai | |
| 4,592,337 | A | 6/1986 | Ritchie et al. | |
| 5,081,982 | A | 1/1992 | MacKenzie | |
| 5,425,671 | A | * 6/1995 | Cunning | 454/209 |
| 5,447,952 | A | 9/1995 | Wulfert et al. | |
| 5,692,491 | A | 12/1997 | Christensen | |
| 7,434,355 | B2 | 10/2008 | Patel et al. | |
| 7,434,577 | B2 | 10/2008 | Doherty | |
| 2007/0199562 | A1 | 8/2007 | Doherty | |
| 2008/0017499 | A1 | 1/2008 | Brockhoff | |
| 2008/0164012 | A1 | 7/2008 | Cavanough et al. | |
| 2011/0120449 | A1 * | 5/2011 | Ryan | 126/628 |

OTHER PUBLICATIONS

"Inflatable Solar Collector China Manufacturers & Suppliers," www.chinasuppliers.globalsources.com, 2009, [retrieved on Mar. 24, 2009] Retrieved from the Internet: <URL: http://www.chinasuppliers.globalsources.com/china-suppliers/Inflatable-Solar-Collector.htm> (85 pages).

"UK firm unveils inflatable solar panel plans," www.energysavingtrust.org.uk, 2008, [retrieved on Mar. 24, 2009] Retrieved from the Internet: <URL: http://www.energysavingtrust.org.uk/Resources/Daily-news/Solar/UK-firm-unveils-inflatable-solar-panel-plans/(energysavingtrust)/26564> (1 page).

"SolarStore," www.idc.uk.com, 2009, [retrieved on Mar. 24, 2009] Retrieved from the Internet: <URL: http://www.idc.uk.com/solarstore/> (2 pages).

"Forced air solar window heaters," www.solarwindowheaters.com, 2009, [retrieved on Mar. 24, 2009] Retrieved from the Internet: <URL: http://www.solarwindowheaters.com/shop/> (9 pages).

Notification of Transmittal of the International Search Report and the Written Opinion of the International Searching Authority for PCT/US2009/060570 (filed Oct. 14, 2009) dated May 4, 2010.

* cited by examiner

PORTABLE SOLAR-HEATING SYSTEM HAVING AN INFLATABLE SOLAR COLLECTOR

CROSS-REFERENCE TO RELATED APPLICATIONS

This application claims priority from U.S. Provisional Patent Application Ser. No. 61/107,738 filed on Oct. 23, 2008, and entitled "Portable Solar Heating Apparatus for Window Installations Having an Inflatable Solar Collector," which is incorporated herein by reference in its entirety.

BACKGROUND

1. Field of the Invention

The present invention relates to solar-energy utilization and, more specifically, to solar-heating systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Heating, ventilation, and air conditioning (HVAC) systems account for about one half of the energy used in residential buildings in the United States. Solar HVAC technologies can be used to offset at least a portion of this energy. The U.S. Energy Information Administration (EIA) classifies solar-heating systems into three categories: low-, medium-, and high-temperature systems. Low-temperature systems are usually used to heat swimming pools and for space heating. Medium-temperature systems usually generate hot water for residential and commercial use. High-temperature systems concentrate sunlight using mirrors and/or lenses and are generally used for generating electricity.

A typical household solar-heating system is a low- or medium-temperature system that has a solar collector, with a heat-transfer fluid (e.g., air or water) flowing through the collector to absorb solar-generated heat and transport it to a storage or distribution subsystem (e.g., a hot water tank or heat radiator). The solar collector is usually placed where solar-radiation levels are relatively high, e.g., on the roof of the house. A pump circulates the heat-transfer fluid through the solar collector and storage/distribution subsystem, thereby transporting the heat to the place of its intended use.

An important consideration for the individual consumer is the cost and ease of deployment of the solar-heating system. For example, a relatively expensive solar-heating system has a relatively long pay-back period, which makes it unattractive to the consumer. A solar-heating system that is permanent or difficult to deploy might similarly be unattractive because the consumer might prefer to have it deployed only when needed, e.g., during the winter months, and have it removed when not needed, e.g., during the periods of hot weather.

SUMMARY

Disclosed herein are various embodiments of a solar-heating system having an inflatable solar collector connected to a housing that can be installed, e.g., in a sash window of a house. The housing has an air blower that draws air from the interior of the house and directs it into the inflatable solar collector, which is positioned outside the window. The collector has a flexible permeable membrane that serves as a transpired absorber of solar radiation. The air flowing through the collector is heated when it percolates through the membrane exposed to solar light. The heated air is returned back to the interior of the house, thereby providing space heating. In certain embodiments, in addition to serving as a transpired absorber, the membrane can also serve as an air filter that removes particles, odor-causing pollutants, and/or allergens from the drawn air. Advantageously, inflatable solar collectors of the invention can be manufactured using inexpensive, durable, and readily available materials. The collectors are inherently resilient to impact and shock, relatively easy to deploy and remove as needed, easy to adjust to the surrounding terrain and secure at a desired tilt angle, and easy to clean.

According to one embodiment, provided is a system having (i) a housing with an air-intake register and an air-exhaust register and (ii) an inflatable solar collector operatively connectable to the housing. The housing has an air blower configured to draw air through the air-intake register and direct the drawn air into a tube connectable to the inflatable solar collector. The inflatable solar collector has a first chamber and a second chamber separated by a flexible permeable membrane. In operation, air pressure generated by the air blower causes the drawn air to flow through the tube into the first chamber, percolate through the permeable membrane into the second chamber, and exhaust from the second chamber through the air-exhaust register.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1A:
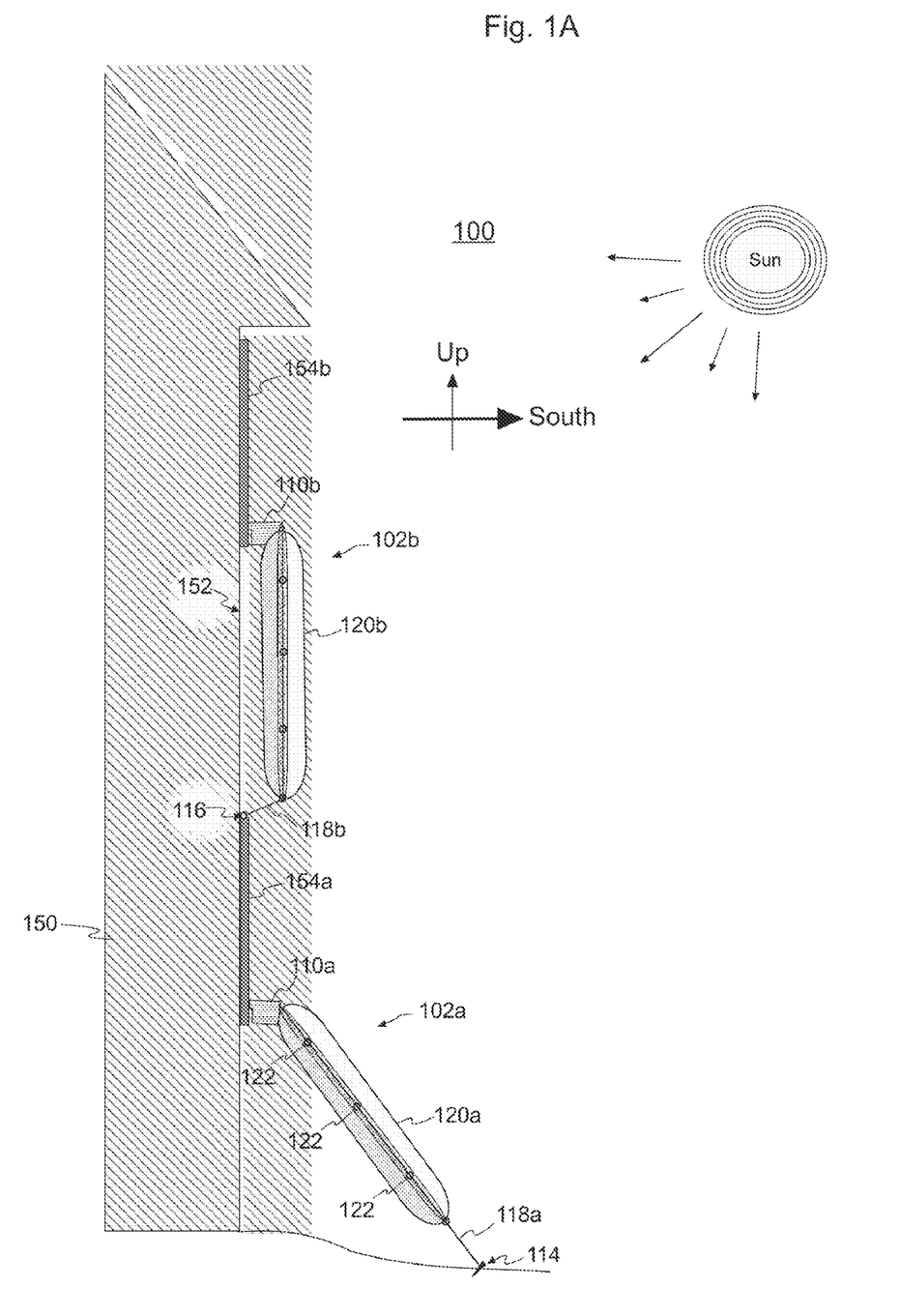
FIGS. 1A-B show diagrammatic views of a solar-heating system according to one embodiment of the invention.
Figure 1B:
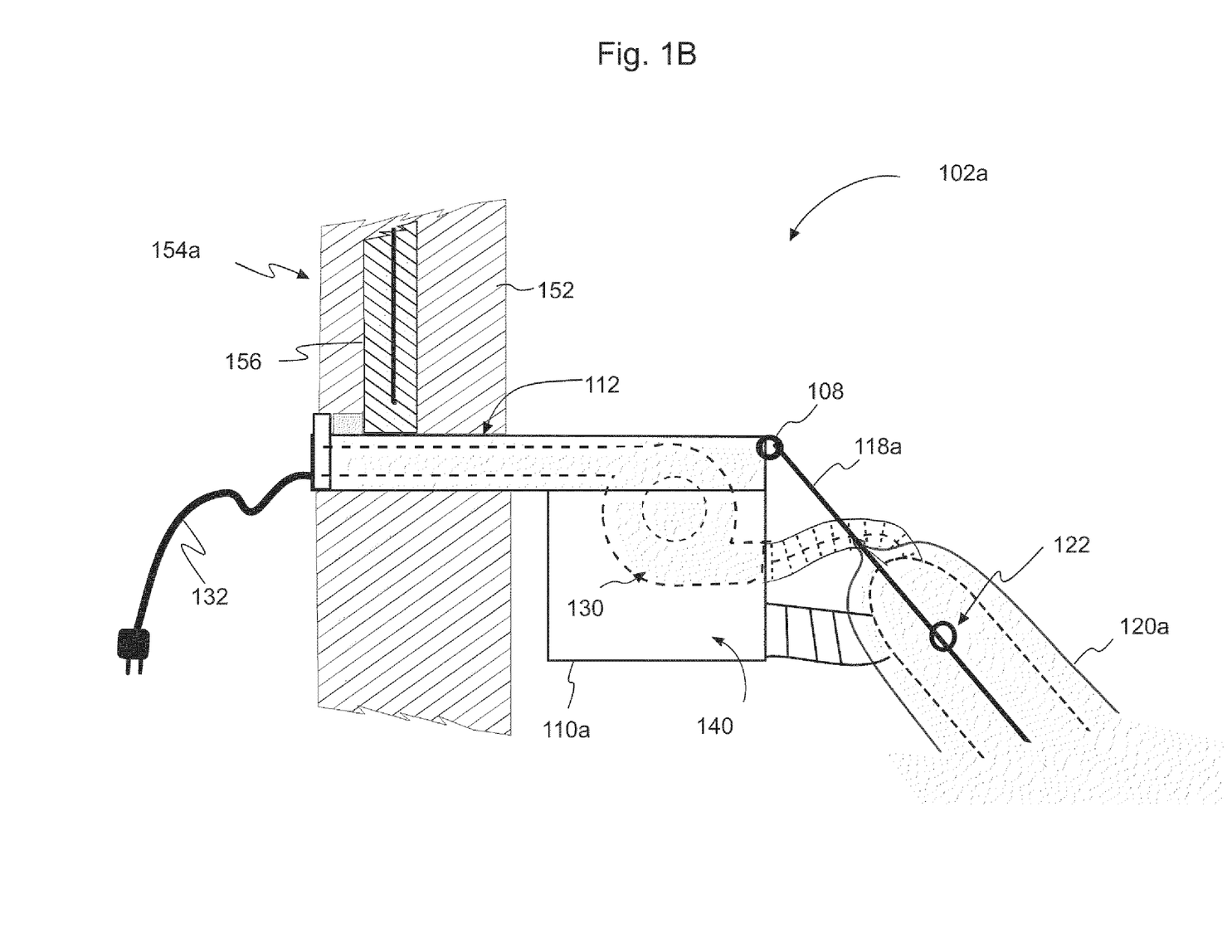

FIGS. 1A-B show diagrammatic views of a solar-heating system 100 having two substantially analogous solar-heating units 102a and 102b according to one embodiment of the invention. More specifically, FIG. 1A shows each of solar-heating units 102a and 102b deployed at the exterior of a structure (e.g., a house) 150. FIG. 1B shows an enlarged cross-sectional view of a portion of solar-heating unit 102a. Although each of solar-heating units 102a and 102b can be deployed at any suitable location adjacent to structure 150, a location that can maximize the amount of solar energy collected by the solar-heating unit, such as a wall 152 with a southern exposure (in the Northern Hemisphere), is generally preferred.

Solar-heating unit 102 has a housing 110 and an inflatable solar collector 120 that is operatively connected to the housing. In general, housing 110 can be mounted in any suitable opening in a wall or roof of structure 150. For example, housing 110a of solar-heating unit 102a rests on the lower windowsill of a first-floor window 154a and is secured in place by a sliding sash 156, which is pushed down against an upper side 112 of the housing (see FIG. 1B). Housing 110b of solar-heating unit 102b is similarly secured in a second-floor window 154b.

Collector 120a of solar-heating unit 102a is deployed in a tilted position. More specifically, side rings or hooks 122 of collector 120a are attached to tethers 118a, with each of the tethers being tightly extended between a respective anchor 114 (see FIG. 1A) and a respective ring 108 of housing 110a (see FIG. 1B). Anchors 114 are hammered into the ground to form a desired angle between tethers 118a and the exterior surface of wall 152, which causes collector 120a to be oriented at that angle with respect to that surface.

Collector 120b of solar-heating unit 102b hangs vertically, under its own weight, from housing 110b (FIG. 1A). Tethers 118b, which are similar to tethers 118a, are loosely connected to a wall hook 116, e.g., to prevent excessive flapping of collector 120b in wind gusts. One skilled in the art will understand that other suitable arrangements for mounting/securing housing 110 and/or collector 120 can similarly be used in other embodiments of the invention.

Inflatable solar collector 120 relies on internal air pressure to maintain its shape. When depressurized and deflated, collector 120 can be rolled up or folded to occupy a relatively small volume. In one embodiment, housing 110 has a compartment 140 that can be used to store collector 120 in a deflated state.

Housing 110 has an electrical air blower 130 (see FIG. 1B) whose power cord 132 can be plugged into an electrical outlet, e.g., inside structure 150. In operation, air blower 130 draws air from the interior of structure 150 and directs the drawn air into collector 120, thereby inflating it. The air flows through various chambers of collector 120 and is then exhausted back into the interior of structure 150. When collector 120 is exposed to solar radiation, the air flowing through the collector is heated up, which causes the heated air to transport the solar-generated heat from the collector to the interior of structure 150, thereby providing space heating.

Figure 2A:
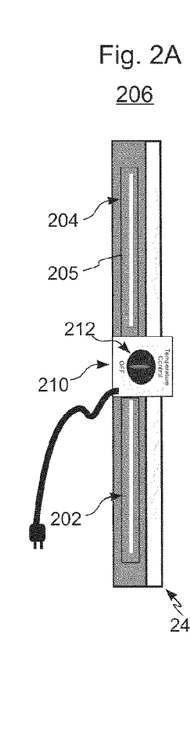
FIGS. 2A-D show diagrammatic views of a housing that can be used in a solar-heating unit of the solar-heating system shown in FIG. 1 according to one embodiment of the invention.
Figure 2B:
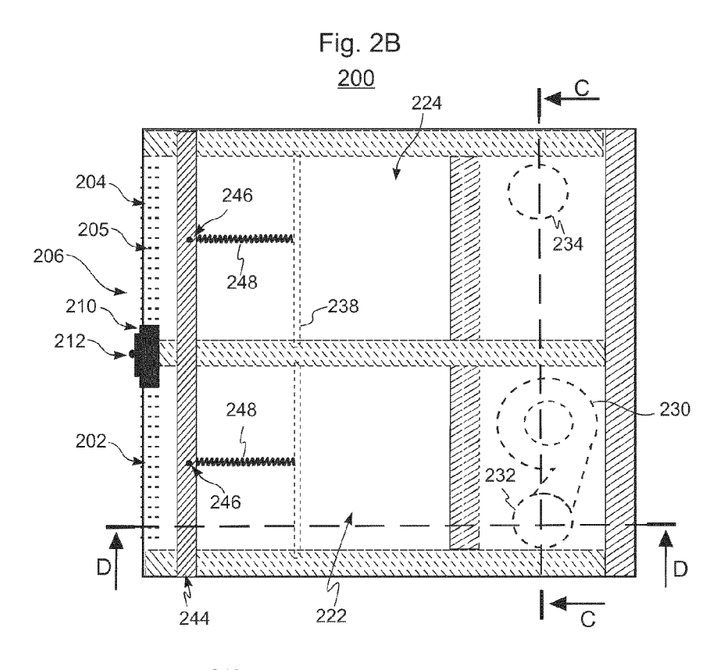
Figure 2C:
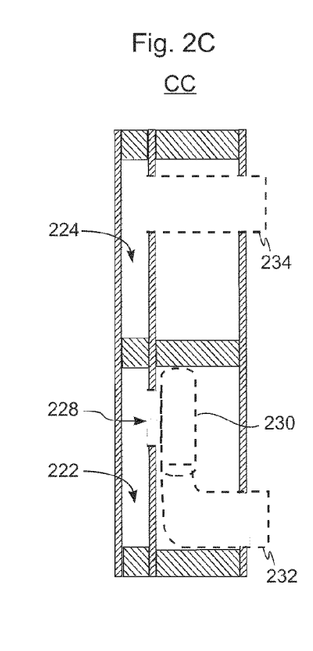
Figure 2D:
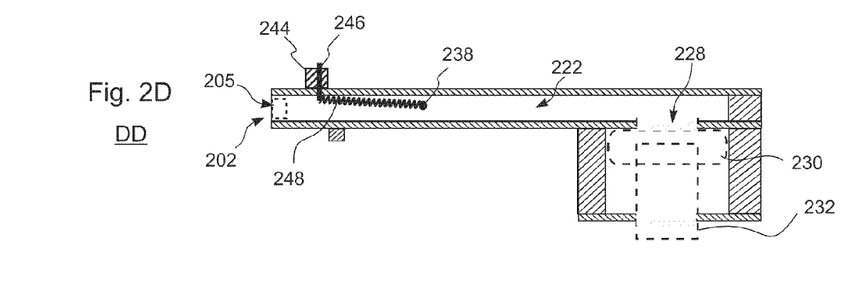

FIGS. 2A-D show diagrammatic views of a housing 200 that can be used as housing 110 (FIG. 1) according to one embodiment of the invention. More specifically, FIG. 2A shows a front view of housing 200, which corresponds to a view, e.g., from the interior of structure 150 (also see FIG. 1B). FIG. 2B shows a top cross-sectional view of housing 200. FIGS. 2C-D show side cross-sectional views of housing 200 corresponding to planes CC and DD, respectively, shown in FIG. 2B.

Referring to FIG. 2A, a front panel 206 of housing 200 has an air-intake register 202 for drawing air, e.g., from the interior of structure 150, and an air-exhaust register 204 for returning the air heated in the solar collector (e.g., collector 120, FIG. 1) back to the interior of the structure. In one embodiment, one or both of registers 202 and 204 have adjustable shutters 205 that can be used, e.g., to shut off the registers or to regulate the volume/direction of the air intake/exhaust.

Front panel 206 further has a control module 210 for controlling the operation of the solar-heating unit. Control module 210 has a temperature-control knob 212 that can be used to set a target room temperature. One or more temperature sensors (not explicitly shown in FIG. 2) located in housing 200 and/or in the solar collector coupled to the housing provide the corresponding temperature readings for control module 210. Based on the temperature setting and the temperature readings, control module 210 can turn ON and OFF an air blower or pump 230 located inside housing 200 (see FIGS. 2B-D). For example, control module 210 can turn ON air blower 230 when the temperature in the interior of structure 150 is lower than the temperature setting and the temperature inside collector 120. Control module 210 can turn OFF air blower 230, e.g., when (i) the temperature of the incoming air reaches the temperature setting or (ii) the temperature of the outgoing air is lower than the temperature of the incoming air.

Referring to FIGS. 2B-D, housing 200 has an intake chamber 222 that connects air-intake register 202 to an input port 228 of air blower 230. In operation, air blower 230 draws air from intake chamber 222 and blows it into an air supply tube 232 connected to an input port of the solar collector. The air pressure generated by air blower 230 pushes the air through air-supply tube 232 into the solar collector and forces the air to exhaust from an output port of the solar collector to housing 200 through an air-return tube 234. An air exhaust chamber 224 of housing 200 then directs the air exhausted from air-return tube 234 to air-exhaust register 204. In one embodiment, each of tubes 232 and 234 has thermal insulation (not explicitly shown in FIG. 2) that inhibits heat exchange between the interior and exterior of the tube.

Referring to FIGS. 2B and 2D, a top wall 242 of housing 200 has a movable lip 244 for engaging the sash of the window in which the housing is to be mounted. Housing 200 has a pair of springs 248, each connected between a respective rod 246 attached to lip 244 and an anchor beam 238 attached between the side walls of the housing. When housing 200 is placed on a windowsill, with front panel 206 facing the interior of the house, and the sash is pulled down against top wall 242, springs 248 pull lip 244 against the interior side of the sash frame, thereby locking the housing in place.

Figure 3A:
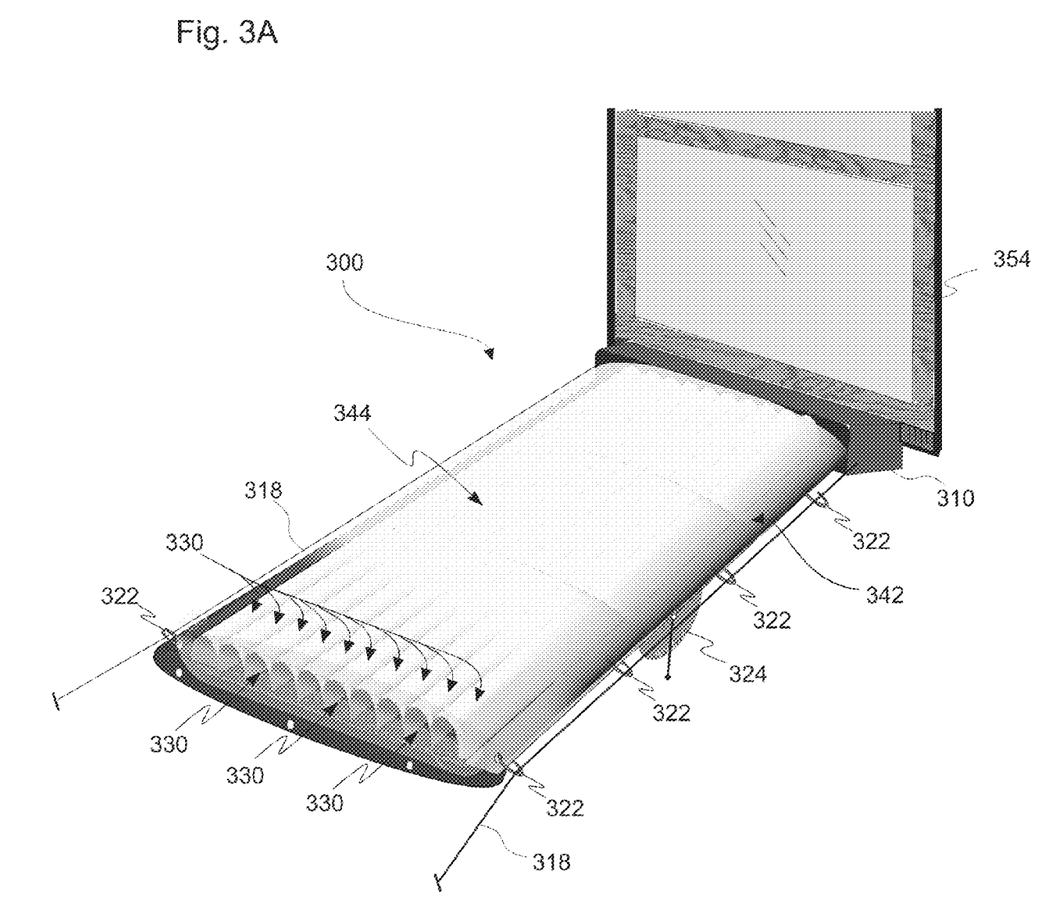
FIGS. 3A-B show perspective three-dimensional views of an inflatable solar collector that can be used in a solar-heating unit of the solar-heating system shown in FIG. 1 according to one embodiment of the invention.
Figure 3B:
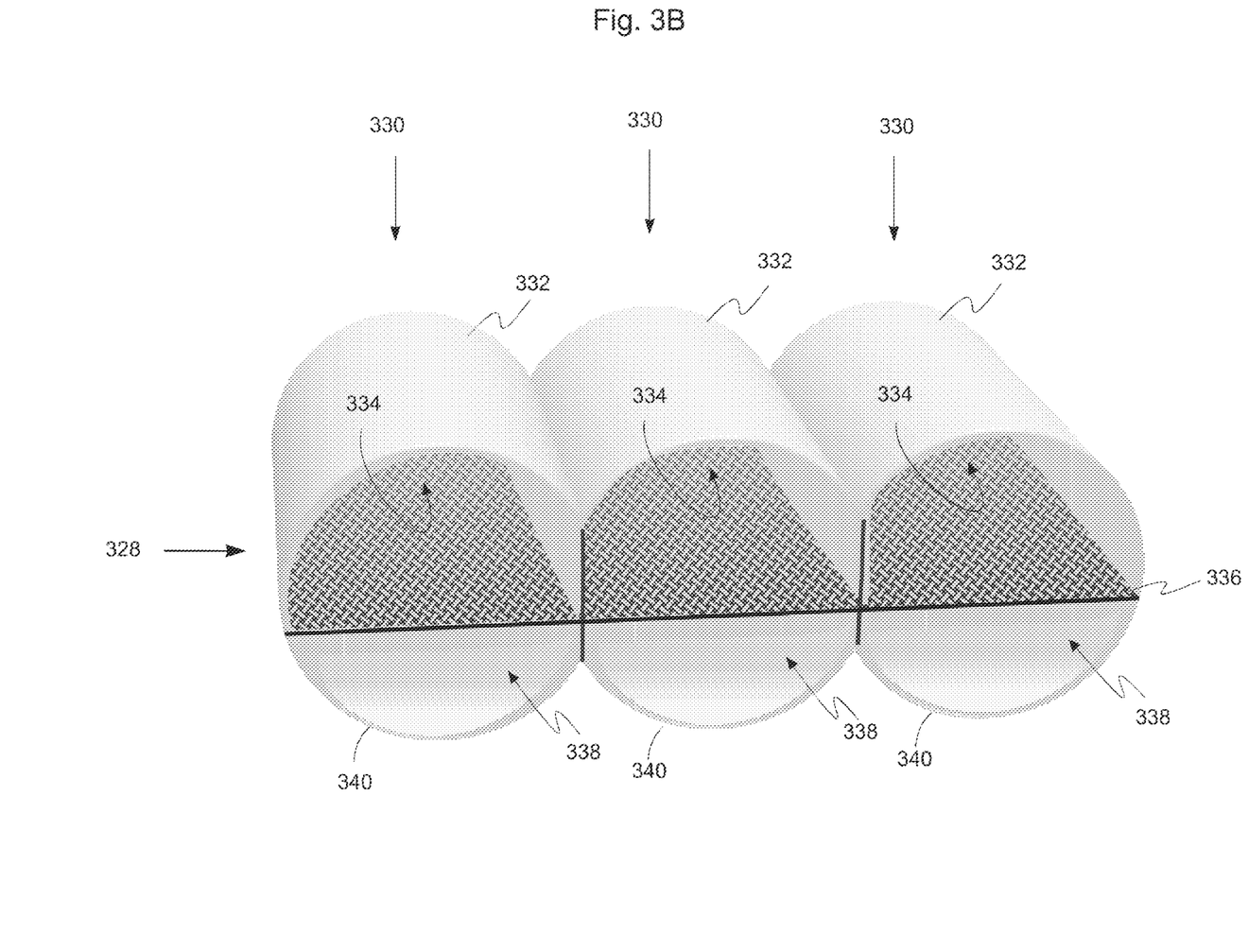

FIGS. 3A-B show perspective three-dimensional views of an inflatable solar collector 300 that can be used as collector 120 (FIG. 1) according to one embodiment of the invention. More specifically, FIG. 3A shows collector 300 in a deployed state, being operatively connected to a housing 310 that is installed in a sash window 354. Housing 310 is generally analogous to housing 110 (FIG. 1) or housing 200 (FIG. 2). FIG. 3B shows an enlarged view of an inner portion of collector 300.

In a typical embodiment, collector 300 is constructed using flexible (e.g., fabric-like) sheets of material. As used herein, the term "flexible" refers to the inherent capability of an object or material to reversibly change its shape, e.g., to be folded and unfolded, to be rolled into a relatively tight roll and then unrolled back into a substantially flat sheet, and/or to be tightly packed into a relatively small volume and then unpacked without sustaining irreversible structural damage. The flexible sheets used in collector 300 are bonded together to form a plurality of chambers that can be inflated and deflated as appropriate or necessary, e.g., similar to an inflatable mattress or a pool raft. The description of the various chambers of collector 300 that is given below corresponds to a fully inflated state of the collector. In a deflated state, collector 300, as whole, can be compacted, e.g., into a relatively tight roll whose volume does not exceed about 20%, 15%, or 10% of the volume of the collector in the fully inflated state.

Referring to FIG. 3A, collector 300 has a plurality of hooks 322 attached to a side seam of the collector. Hooks 322 can be used, e.g., as indicated in FIG. 3A, to attach collector 300 to tethers 318 in order to (i) adjust the orientation of the collector for optimum performance and/or (ii) secure the collector in windy conditions (also see FIG. 1). Collector 300 further has an optional protractor flap 324 that can be used in the process of orienting the collector at a desired tilt angle. The inner portion of collector 300 has an array 328 of parallel tubular chambers 330. One function of tubular chambers 330 is to direct the air flow inside collector 300 so as to ensure optimal heat extraction from the collector. Another function of tubular chambers 330 is to create an internal support structure for collector 300.

Now referring primarily to FIG. 3B, collector 300 has a flexible permeable membrane 336 that divides each tubular chamber 330 into an upper semi-cylindrical sub-chamber 334 and a lower semi-cylindrical sub-chamber 338. If there is a pressure gradient across membrane 336, then the membrane allows the air from one semi-cylindrical sub-chamber of tubular chamber 330 to leak or percolate into the other semi-cylindrical sub-chamber of that tubular chamber. The pertinent characteristics of membrane 336 are described in more detail below, primarily in reference to FIG. 4.

An upper wall 332 of semi-cylindrical sub-chamber 334 is made of a flexible airtight material that is transparent to visible light. Many commonly available polymeric materials, such as films made of vinyl, polyester, and/or polyethylene, have this characteristic. As a result, wall 332 serves as a glazing layer for membrane 336, which serves as an absorber of solar radiation. In one embodiment, a single sheet of flexible airtight material is used to form walls 332 of all sub-chambers 334. More specifically, this single sheet of material is pleated and attached to membrane 336 as indicated in FIG. 3B.

A lower wall 340 of semi-cylindrical sub-chamber 338 is also airtight and comprises a layer of material capable of reflecting back toward membrane 336 (i) the IR radiation that is emitted by the heated membrane and/or (ii) the visible light transmitted by the membrane. In the inflated state of collector 300, walls 340 form an array of crude parabolic mirrors. These mirrors help to concentrate the reflected IR radiation and visible light onto membrane 336, improve heat transfer from the membrane to the air stream, reduce heat losses in the collector, and increase the efficiency of solar-energy conversion into usable heat. Alternatively or in addition, wall 340 comprises a thermally insulating layer that inhibits heat exchange across the wall. Similar to walls 332, walls 340 of all sub-chambers 338 can be formed from a single sheet of flexible airtight material, pleated and attached to membrane 336.

Referring back to FIG. 3A, collector 300 has an outer airtight shell 342 that encloses array 328 of tubular chambers 330. When collector 300 is inflated, shell 342 creates a cushion of substantially still air around array 328, which helps to further reduce the unwanted heat losses from the array. In addition, shell 342 functions as an adjustable vessel for conveniently handling, positioning, and protecting tubular chambers 330. An upper wall 344 of shell 342 is made of a flexible material that is transparent to visible light, which can be the same as the material of wall 332. In one embodiment, shell 342 has a wicking patch and a water-drain valve (neither explicitly shown) for removing condensates from the interior of collector 300.

In a representative embodiment, membrane 336 serves as a glazed, transpired absorber of solar radiation, with one or both of walls 332 and 344 providing the glazing for the membrane. As used herein the term "transpired absorber" means that the corresponding entity absorbs a significant portion (e.g., more than 50%) of solar radiation impinging thereupon and allows an air stream to pass therethrough. In an alternative embodiment, in addition to serving as a transpired absorber, membrane 336 also serves as an air filter that captures allergens and/or particulate matter, e.g., particles having a size greater than about 10 µm and smaller than about 100 µm. In various embodiments, membrane 336 can have (i) a thickness between about 1 and 10 mm and (ii) a porosity, p, greater than about 50% or even greater than about 80%. Herein, porosity p is defined as a ratio of the pore volume within a square inch of membrane 336 to the total volume occupied by that square inch.

FIGS. 4A-E show representative flexible permeable layers 410, 420, 430, 440, and 450 that can be used to form membrane 336 according to various embodiments of the invention. In general, membrane 336 can have one or more layers selected from layers 410-450. In certain embodiments, membrane 336 might contain two or more layers of the same type separated by at least one layer of a different type. For example, in one embodiment, membrane 336 might have one instance of layer 450 sandwiched between two instances of layer 430. One skilled in the art will understand that, in various embodiments, other layers of various suitable materials can be used in addition to or instead of layers 410-450 to form membrane 336.

Figure 4A:
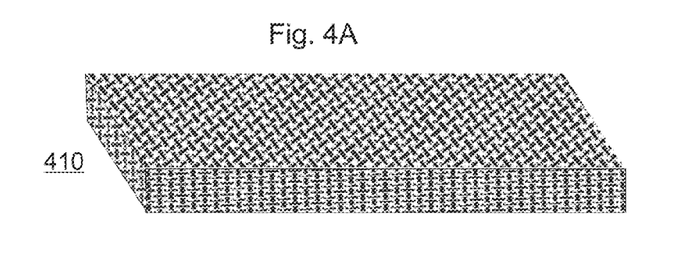
FIGS. 4A-E schematically show representative flexible permeable layers that can be used to form a flexible permeable membrane for the inflatable solar collector of FIG. 3 according to various embodiments of the invention.

Referring to FIG. 4A, layer 410 comprises a woven fabric or cloth. As used herein, the term "woven fabric" refers to a sheet of material produced by interlacing two or more sets of yarns, fibers, threads, strings, and/or filaments, wherein the elements within the same set are substantially parallel to each other, and the elements from two different sets are oriented with respect to each other at a predetermined angle, e.g., 90 degrees. In various embodiments, layer 410 might have fibers with a diameter between about 0.1 µm and about 100 µm, or a mixture of fibers of different diameters.

Figure 4B:
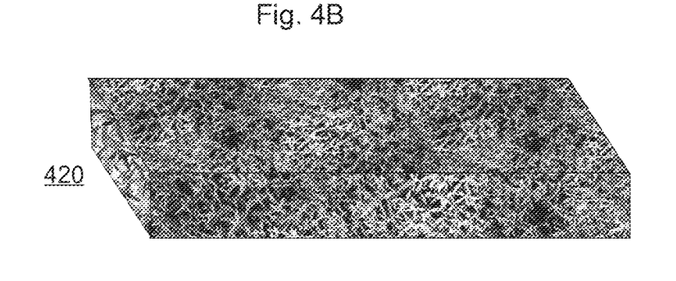

Referring to FIG. 4B, layer 420 comprises a sheet of porous permeable polymer. More specifically, layer 420 comprises a polymeric matrix having a regular or irregular network of interconnected channels, conduits, pores, voids, and cavities that allow air to percolate through the layer. Representative examples of porous permeable polymers are sponges and porous solidified foams.

Figure 4C:
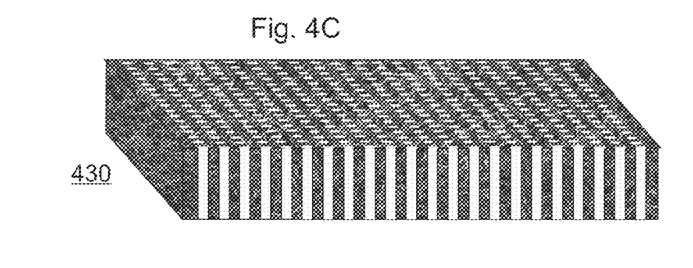

Referring to FIG. 4C, layer 430 comprises a sheet of pin-perforated material. In various embodiments, the perforation holes can be arranged in various patterns, regular or irregular, and have the same or different diameters. The material can be a solid polymer or polymeric foam, a woven or non-woven cloth, etc.

Figure 4D:
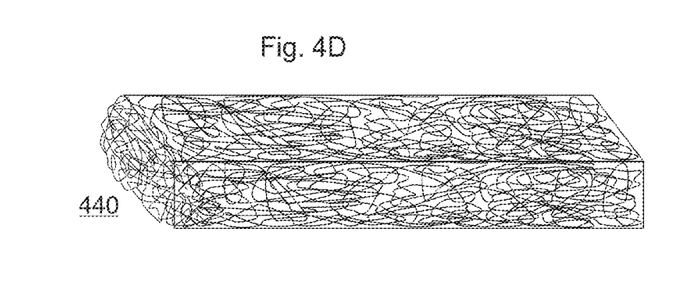

Referring to FIG. 4D, layer 440 comprises a non-woven fabric. As used herein, the term "non-woven fabric" refers to a sheet of fabric-like material made from long fibers or filaments that are bonded together by chemical, mechanical, thermal, or solvent treatment, but not by weaving or knitting. A representative example of a non-woven fabric is felt. In a representative embodiment, layer 440 can be made by mechanically entangling various fibers or by pulverizing molten plastic or plastic film. In various embodiments, layer 440 might have fibers with a diameter between about 0.1 µm and about 100 µm, or a mixture of fibers of different diameters.

Figure 4E:
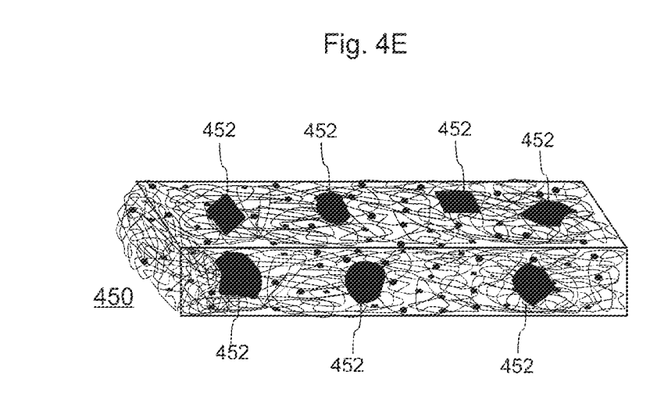

Referring to FIG. 4E, layer 450 comprises a sheet of permeable composite material. As used herein the term "composite material" refers to a material made from two or more constituent materials having significantly different physical and/or chemical properties, which constituent materials remain separate and distinct on a macroscopic level within the finished structure. In a representative embodiment shown in FIG. 4E, layer 450 is a sheet of felt impregnated with particles 452 of activated carbon. When an air stream goes through layer 450, particles 452 absorb and/or adsorb allergens, pathogens, and/or odor-causing pollutants, thereby aiding the air-filtering function of membrane 336.

Figure 5A:
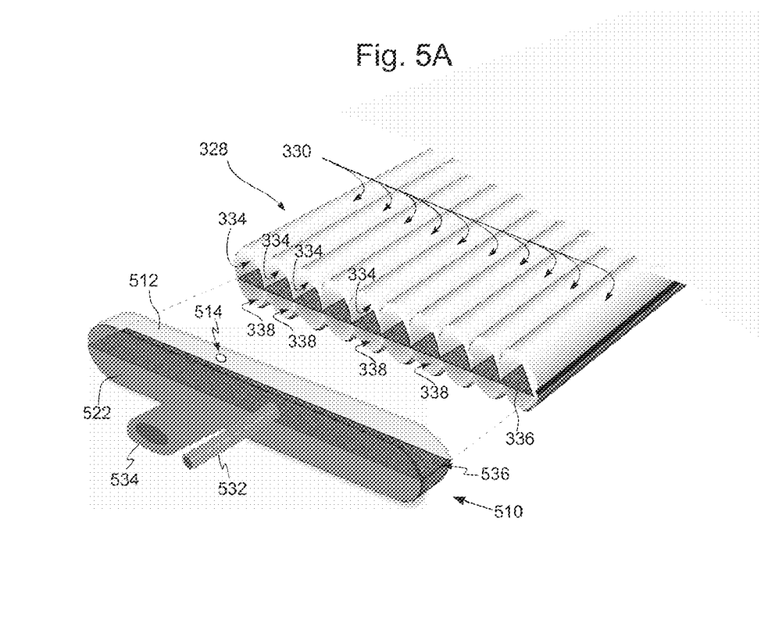
FIGS. 5A-B show perspective three-dimensional blow-up views of various airflow-distribution components that can be used in the inflatable solar collector of FIG. 3 according to one embodiment of the invention.
Figure 5B:
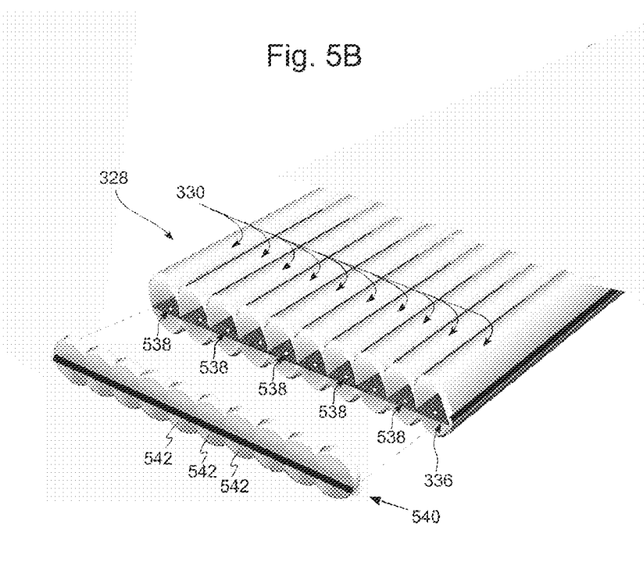

FIGS. 5A-B show perspective three-dimensional blow-up views of various airflow-distribution components that can be used in collector 300 (FIG. 3) according to one embodiment of the invention. More specifically, FIG. 5A shows a blow-up view, in which an end panel 510 is detached from the front end of array 328 of parallel tubular chambers 330 (also see FIG. 3B). FIG. 5B shows a blow-up view, in which an end panel 540 is detached from the back end of array 328.

Referring to FIG. 5A, end panel 510 has an air-distribution manifold 512 and an air-exhaust manifold 522. Air-distribution manifold 512 has an input tube 532 that can be connected, e.g., to tube 232 of housing 200 (see FIG. 2). Air-distribution manifold 512 also has an output port 514 that supplies air to and maintains air pressure in outer shell 342 of collector 300 (see FIG. 3A). More specifically, when collector 300 is being deployed, port 514 supplies air for the inflation of shell 342. After shell 342 is fully inflated and there is no pressure differential between air-distribution manifold 512 and the shell, port 514 seals off the shell to maintain the corresponding air pressure therein. Air-exhaust manifold 522 has an output tube 534 that can be connected, e.g., to tube 234 of housing 200 (see FIG. 2).

End panel 510 has an airtight barrier 536 that physically separates manifolds 512 and 522 from one another, while serving as a shared wall for these manifolds. When end panel 510 is attached to the front end of array 328, barrier 536 is mated with membrane 336, thereby blocking direct airflow between manifolds 512 and 522. The air stream entering air-distribution manifold 512 from input tube 532 is divided and distributed substantially evenly between different semi-cylindrical sub-chambers 334 of array 328. Similarly, the air streams received by air-exhaust manifold 522 from different semi-cylindrical sub-chambers 338 of array 328 are merged and directed into output tube 534. As used herein, the term "substantially evenly" means that the differences in air flux between different sub-chambers 334 does not exceed, e.g., 15%, 10%, or even 5%.

Referring to FIG. 5B, end panel 540 has an array of caps 542. When end panel 540 is attached to the back end of array 328, each cap 542 forms a terminal wall that seals off the corresponding end of tubular chamber 330. Note that, in each tubular chamber 330 near cap 542, membrane 336 has an air-release port 538. In operation, air-release port 538 injects a small jet of air into the corresponding semi-cylindrical sub-chamber 338 to increase airflow near the back end of array 328. The increase in the airflow near the back end of array 328 is beneficial because it decreases variations in heat exchange rates across the length of membrane 336, e.g., a difference between the rates at the front and back ends of the array, thereby improving the overall heat-transfer efficiency.

Figure 6A:
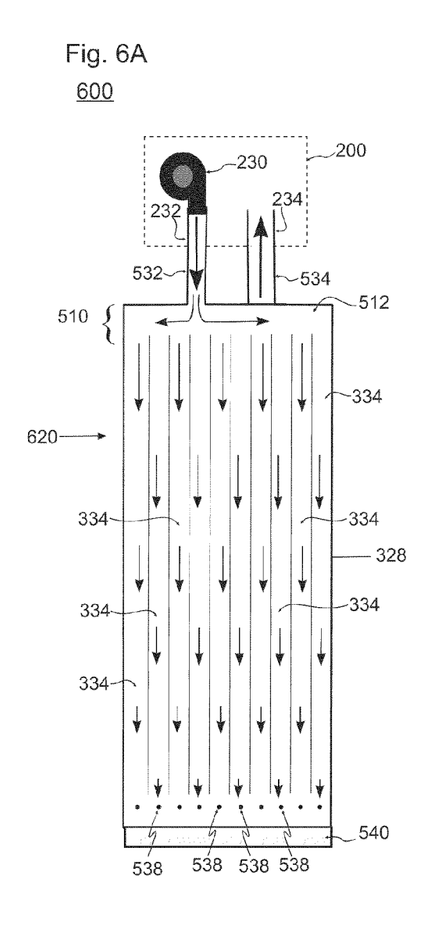
FIGS. 6A-B schematically show an airflow pattern in an inflatable solar collector of a solar-heating unit according to one embodiment of the invention.
Figure 6B:
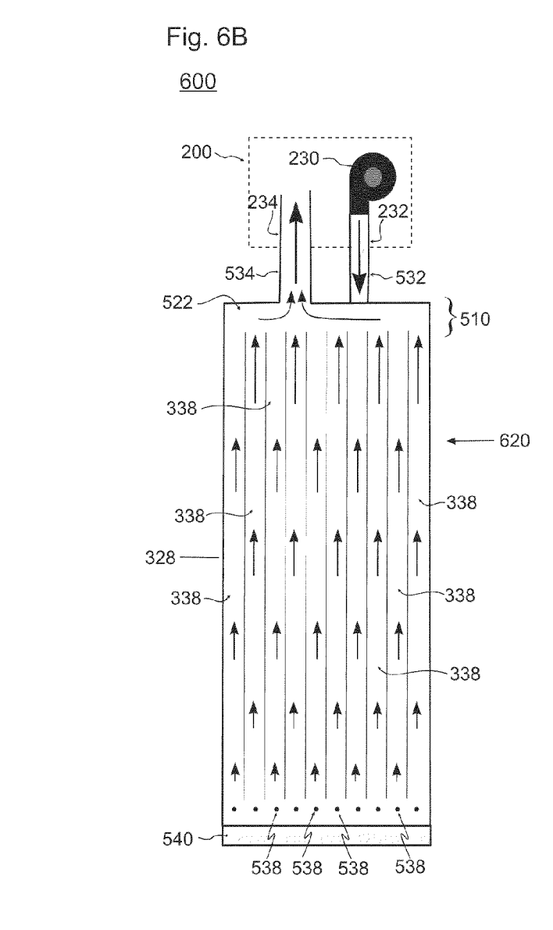

FIGS. 6A-B schematically show an airflow pattern in a solar-heating unit 600 according to one embodiment of the invention. More specifically, FIGS. 6A and 6B shows top and bottom views, respectively, of a collector 620 used in solar-heating unit 600. Collector 620 comprises array 328 connected between end panels 510 and 540 (see FIG. 5). Solar-heating unit 600 also has housing 200 (see FIG. 2), to which collector 620 is connected. Different arrows in FIGS. 6A-B indicate the volumes and directions of local air fluxes throughout collector 620. More specifically, the length and direction of the arrow indicate the volume and direction, respectively, of the air flux.

Referring to FIG. 6A, the air stream generated by air blower 230 in housing 200 enters, through tubes 232 and 532, air-distribution manifold 512 of end panel 510. Manifold 512 distributes the received air stream substantially evenly between different sub-chambers 334 of array 328. The air flux in each sub-chamber 334 gradually decreases as the air moves toward end panel 540 because the air percolates through membrane 336 into the corresponding sub-chamber 338. In one embodiment, the combined length of tubes 232 and 532 is smaller than about 1 m, or even smaller than about 0.5 m. The combined length of tubes 234 and 534 is substantially the same as the combined length of tubes 232 and 532.

Referring to FIG. 6B, the air flux in each sub-chamber 338 gradually increases as the air moves from end panel 540 toward air-exhaust manifold 522 of end panel 510 due to the additional air percolating through membrane 336 from the corresponding sub-chamber 334. Manifold 522 collects the air received from different sub-chambers 338. The collected air exits collector 620 through tubes 534 and 234.

The airflow pattern indicated in FIG. 6 has certain advantages over other possible airflow patterns when collector 620 is deployed so that end panel 510 is at a higher elevation above ground than end panel 540. More specifically, the downdraft flow of the unheated air in sub-chambers 334 opposes the natural tendency of heated air to rise due to its relatively high buoyancy. As a result, the heated air is forced into sub-chambers 338, which have lower heat losses than sub-chambers 334 due to the presence of IR-reflecting and/or thermally insulating layers in walls 340 (see FIG. 3B). In addition, substantially all air flowing through collector 620 comes into contact with the underside of membrane 336, which is heated by the solar light reflected by the crude parabolic mirrors formed by walls 340, thereby extracting additional heat from the membrane. Advantageously, due to all these features of collector 620, the efficiency of solar-energy conversion into usable heat in solar-heating unit 600 is relatively high in comparison to other flat-panel air-heating solar collectors.

Inflatable solar collectors according to various embodiments of the invention offer one or more of the following advantages over comparable prior-art devices. An inflatable solar collector according to a representative embodiment of the invention can be manufactured using inexpensive, durable, readily available materials. The collector is relatively easy to deploy and remove as needed. In the collapsed state, the collector occupies a very small volume and can be stored in a storage compartment of the housing, which houses the air blower and easy-to-operate temperature-control circuitry. The collector is easy to adjust to the surrounding terrain and secure at a desired tilt angle. The collector is inherently resilient to impact and shock. Its smooth exterior shell sheds precipitation and is easy to clean. In addition to supplying heated air, certain embodiments of the collector can also serve as air filters.

As used in this specification, the term "inflatable" refers to an object that is capable of (i) swelling or distending with air or gas, (ii) being puffed up, and/or (iii) expanding or increasing significantly in size when pumped with air or gas.

While this invention has been described with reference to illustrative embodiments, this description is not intended to be construed in a limiting sense. One of ordinary skill in the art will understand that airflow patterns that differ from the pattern indicated in FIG. 6 can also be used in various embodiments of the invention. Various dyes and additives can be used to optimize the color and/or absorption spectrum of membrane 336 for optimal absorption of solar radiation. Although various embodiments of the invention have been described in reference to tubular chambers 330 having round or circular cross-sections, tubular chambers having other cross-section geometries, e.g., rectangular or rectilinear, can similarly be used. Also, the tubular chambers can be designed and arranged so that they are not straight and/or parallel to one another. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy or matter is allowed to be transferred between two or more elements, and the interposition of one or more additional elements is contemplated, although not required. Conversely, the terms "directly coupled," "directly connected," etc., imply the absence of such additional elements.

The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. The same applies to other above-indicated terms.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

I claim:

1. A system, comprising:
    a housing having an air-intake register and an air-exhaust register; and
    an inflatable solar collector operatively connectable to the housing, wherein:
        the housing comprises an air blower configured to draw air through the air-intake register and direct the drawn air into a tube connectable to the inflatable solar collector;
        the inflatable solar collector comprises a first chamber and a second chamber separated by a flexible permeable membrane;
        in operation, air pressure generated by the air blower causes the drawn air to flow through the tube into the first chamber, percolate through the permeable membrane into the second chamber, and exhaust from the second chamber through the air-exhaust register;
        the inflatable solar collector comprises a plurality of tubular chambers, each divided by the permeable membrane into a respective first sub-chamber and a respective second sub-chamber;
        the first sub-chamber is part of the first chamber; and
        the second sub-chamber is part of the second chamber.

2. The system of claim 1, wherein the housing is adapted to be mounted in an opening of a structure having an interior and an exterior so that (i) the air-intake register and the air-exhaust register are located in the interior and (ii) the inflatable solar collector is located in the exterior.

3. The system of claim 2, wherein:
    the opening is a sash window; and
    the housing comprises a movable lip for engaging a sash of the sash window.

4. The system of claim 2, wherein, if the housing is mounted in the opening, then the air blower is located in the exterior.

5. The system of claim 1, wherein the inflatable solar collector comprises means for engaging one or more tethers to secure the inflatable solar collector in a desired position.

6. The system of claim 1, wherein the tube is shorter than about 1 m.

7. The system of claim 1, wherein:
    the permeable membrane is adapted to serve as a transpired absorber of solar radiation; and
    a flexible wall of the first chamber is adapted to serve as a glazing layer for said absorber.

8. The system of claim 1, wherein:
    the permeable membrane is adapted to transmit at least a portion of solar radiation impinging thereupon; and
    a wall of the second chamber comprises a reflective layer adapted to reflect said portion back toward the permeable membrane.

9. The system of claim 1, wherein:
    in an inflated state of the inflatable solar collector, the second sub-chambers are semi-cylindrical sub-chambers; and
    walls of said semi-cylindrical sub-chambers form an array of crude parabolic minors adapted to reflect radiation transmitted or emitted by the permeable membrane back toward the membrane.

10. The system of claim 1, wherein the inflatable solar collector comprises an air-distribution manifold adapted to distribute a stream of air received through the tube substantially evenly between the first sub-chambers.

11. The system of claim 1, wherein the inflatable solar collector comprises an end panel having (i) an air-distribution manifold adapted to distribute a stream of air received through the tube between the first sub-chambers and (ii) an air-exhaust manifold adapted to collect air from the second sub-chambers and direct the collected air toward the exhaust register, wherein the end panel comprises an airtight barrier that serves as a shared wall for said manifolds.

12. The system of claim 11, wherein an edge of the barrier is mated with an edge of the permeable membrane.

13. The system of claim 1, wherein the tubular chambers are parallel to each other.

14. The system of claim 1, wherein the inflatable solar collector comprises an inflatable shell that encloses the plurality of tubular chambers.

15. The system of claim 1, wherein, in operation, the permeable membrane serves as an air filter adapted to perform one or more of the following:
  (i) remove particles having a size between about 10 μm and about 100 μm from the drawn air;
  (ii) remove an odor-causing pollutant from the drawn air; and
  (iii) remove an allergen or a pathogen from the drawn air.

16. The system of claim 1, wherein the permeable membrane comprises one or more layers selected from a set consisting of:
  (i) a woven fabric;
  (ii) a sheet of porous permeable polymer;
  (iii) a sheet of pin-perforated material;
  (iv) a permeable non-woven fabric; and
  (v) a sheet of permeable composite material.

17. The system of claim 1, further comprising:
  a control module; and
  one or more temperature sensors operatively coupled to the control module to provide to the control module one or more temperature readings from corresponding locations in the system, wherein the control module is adapted to turn ON and OFF the air blower based on said one or more temperature readings.

18. The system of claim 1, wherein the inflatable solar collector is reversibly compactable to occupy a volume that is smaller than about 15% of the volume of said collector in a fully inflated state.

19. A system, comprising:
  a housing having an air-intake register and an air-exhaust register; and
  an inflatable solar collector operatively connectable to the housing, wherein:
    the housing comprises an air blower configured to draw air through the air-intake register and direct the drawn air into a tube connectable to the inflatable solar collector;
    the inflatable solar collector comprises a first chamber and a second chamber separated by a flexible permeable membrane;
    in operation, air pressure generated by the air blower causes the drawn air to flow through the tube into the first chamber, percolate through the permeable membrane into the second chamber, and exhaust from the second chamber through the air-exhaust register; and
    the housing comprises a compartment for storing the inflatable solar collector in a deflated state.

* * * * *